BEST AVAILABLE COPY

A. Whiteley.

Candlestick.

No. 133. A. I. Patented Feb. 5, 1856.

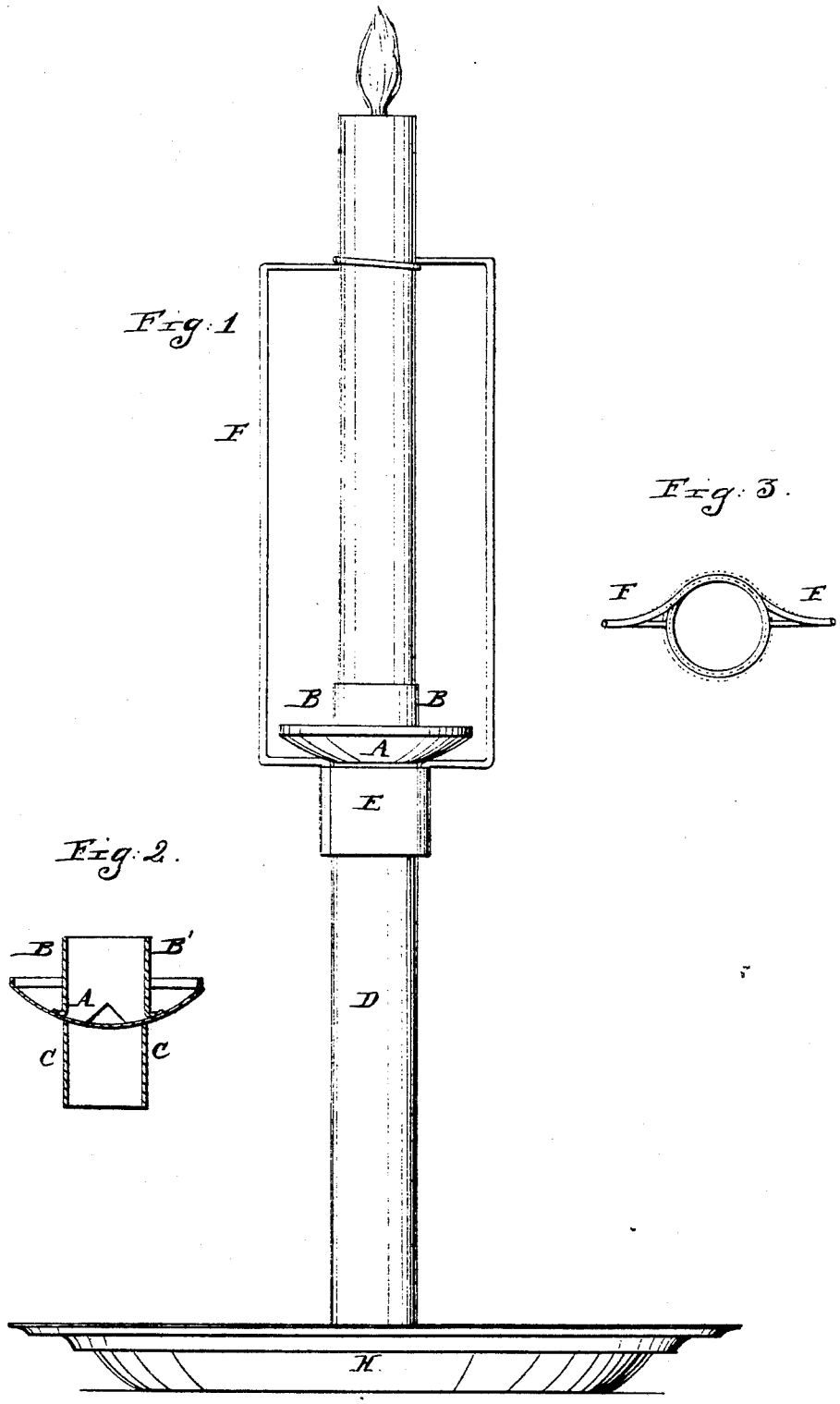

No. 133, to original Letters Patent No. 14,074.—*Improvement in Candlesticks.*

What I claim is:

1st. Securing the lip A to the stem D, and within the slide E F, as described, whereby I am enabled to use a solid lip and avoid all leakage.

2d. I claim the open slide as described, for avoiding damage, as set forth.

H. PETERS, PHOTO-LITHOGRAPHER, WASHINGTON, D. C.